H. F. Read,
Flour Sieve.

No. 52,746.  Patented Feb. 20, 1866.

Attest:
James G. Morgan
John A. Palmer

Inventor:
Henry F. Read

UNITED STATES PATENT OFFICE.

HENRY F. READ, OF BROOKLYN, NEW YORK.

FLOUR-SIFTER.

Specification forming part of Letters Patent No. 52,746, dated February 20, 1866.

*To all whom it may concern:*

Be it known that I, HENRY F. READ, of the city of Brooklyn, county of Kings, and State of New York, have invented an Improvement in Flour-Sifters; and I do hereby declare that the following is a full and exact description of the construction and operation of the same, reference being had to the accompanying drawings and the letters of reference marked thereon, in which—

Figure 1:
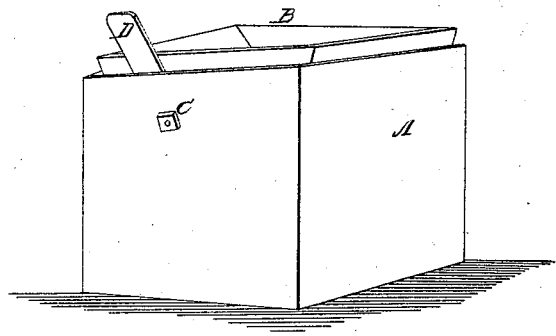
Figure 2:
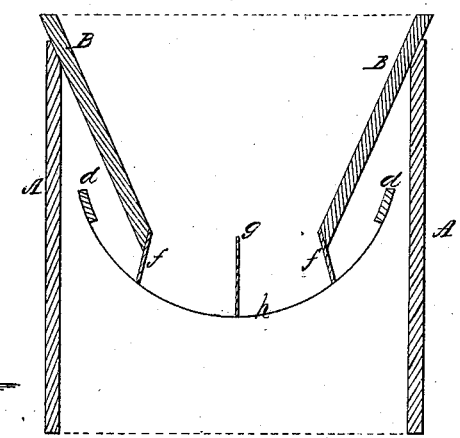
Figure 4:
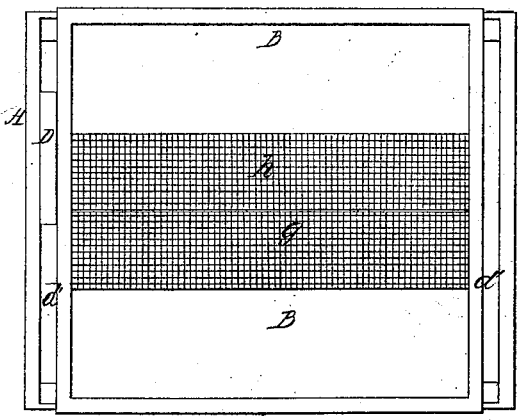
Figure 3:
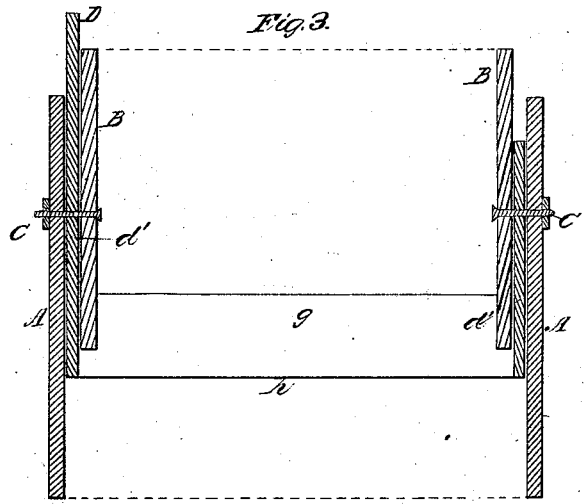

Figure 1 is a perspective view of the sifter. Fig. 2 is a vertical cross-section of the sifter. Fig. 3 is a vertical longitudinal section of the sifter, and Fig. 4 is a top view of the sifter.

This invention refers to that class of sifters mostly used for domestic purposes; and it consists of a rectangular box in which a hopper is placed, emptying into a sieve which is susceptible of an oscillating movement. The prominent peculiarities of this invention are the combination of the hopper and oscillating sieve; also, the manner of packing the lower edges of the sides of the hopper which rub against the sieve, and also a partition through the bottom portion of the hopper, so as to prevent the flour from moving with the movement of the sieve.

I will now proceed to describe the construction and operation of my invention.

A is a rectangular wooden box. B is a wooden hopper. Two of its sides are beveling or inclined toward each other, as shown in Fig. 2, the other two ends being parallel to the sides of the box.

$h$ is a sieve in the form of a section of a cylinder. The ends of the cylinder are made of wood, and one of the ends has a handle, D, formed on it, as shown in Figs. 1 and 3, and the wire of the sieve is fastened to the end above mentioned, and also to the side pieces of wood, $d\ d$, Fig. 2. There are bolts C C, Figs. 1 and 3, which pass through the ends of the hopper, the ends of the sieve, and the box. The bolts hold together the box and the hopper and form the axis on which the sieve oscillates, and are in a line concentric with the center of the axis of the cylinder, of which the sieve is a section.

The bottom edges, $ff$, of the beveled sides of the hopper are of leather or other suitable material, and pack the hopper where it joins the sieve, so as to prevent the flour from escaping while it is being sifted. A stationary partition, $g$, extends lengthwise of the lower portion of the hopper.

In Figs. 1 and 4 the handle D is represented as being on one side the vertical line. In Figs. 2 and 3 the sieve and handle are represented with the handle in a vertical position. I construct the sieve of wire, but I do not bind my invention to any particular kind of material.

The operation of using the sifter is as follows, to wit: The flour is put into the hopper and a rapid oscillating motion is given to the sieve by means of the handle D. The beveled sides of the hopper and the partition $g$ keep the flour from moving, and the rubbing of the sieve against the flour causes it to be sifted through the meshes of the sieve.

Having fully described my improvement, I claim as my invention and desire to secure by Letters Patent—

1. The combination of the box, hopper, and oscillating sieve.

2. The packing $ff$ at the lower edges of the hopper, in combination with said hopper and the oscillating sieve.

3. The stationary partition $g$ in the hopper, in combination with said hopper and oscillating sieve.

HENRY F. READ.

Witnesses:
JAMES G. MORGAN,
JOHN A. PALMER.